(12) United States Patent
Zilberstein et al.

(10) Patent No.: US 11,520,695 B2
(45) Date of Patent: Dec. 6, 2022

(54) STORAGE SYSTEM AND METHOD FOR AUTOMATIC DEFRAGMENTATION OF MEMORY

(71) Applicant: Western Digital Technologies, Inc., San Jose, CA (US)

(72) Inventors: Einav Zilberstein, Had Hasharon (IL); Hadas Oshinsky, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 18 days.

(21) Appl. No.: 17/215,898

(22) Filed: Mar. 29, 2021

(65) Prior Publication Data

US 2022/0283934 A1 Sep. 8, 2022

Related U.S. Application Data

(60) Provisional application No. 63/155,512, filed on Mar. 2, 2021.

(51) Int. Cl.
*G06F 12/02* (2006.01)
*G06F 12/0882* (2016.01)
*G06F 3/06* (2006.01)

(52) U.S. Cl.
CPC ........ *G06F 12/0238* (2013.01); *G06F 3/0616* (2013.01); *G06F 3/0659* (2013.01); *G06F 3/0673* (2013.01); *G06F 12/0253* (2013.01); *G06F 12/0882* (2013.01); *G06F 2212/7201* (2013.01)

(58) Field of Classification Search
CPC ............ G06F 12/0238; G06F 12/0253; G06F 12/0882; G06F 2212/7201; G06F 3/0616; G06F 3/0659; G06F 3/0673
See application file for complete search history.

(56) References Cited

U.S. PATENT DOCUMENTS

| | | | |
|---|---|---|---|
| 8,051,265 B2 | 11/2011 | Lee et al. | |
| 8,190,811 B2 | 5/2012 | Moon et al. | |
| 8,626,987 B2 | 1/2014 | Jung et al. | |
| 8,819,375 B1 | 8/2014 | Pruett et al. | |
| 8,990,477 B2 | 3/2015 | Parker et al. | |
| 9,189,392 B1 * | 11/2015 | Neppalli | G06F 3/0613 |
| 9,355,027 B2 | 5/2016 | Park et al. | |
| 9,542,307 B2 | 1/2017 | Karp | |
| 2008/0077762 A1 * | 3/2008 | Scott | G06F 16/1724 |
| | | | 711/170 |
| 2008/0133573 A1 * | 6/2008 | Haft | G06F 16/2423 |
| | | | 707/999.102 |

(Continued)

FOREIGN PATENT DOCUMENTS

CN 110377527 A * 10/2019

*Primary Examiner* — Michael Krofcheck
(74) *Attorney, Agent, or Firm* — Crowell & Moring LLP (57) ABSTRACT

A storage system determines whether its memory is fragmented (e.g., based on a host read pattern that indicates that a sequential file is being read, but the number of data sense operations required to perform this read indicates that file is stored non-sequentially in the memory). If the storage system determines that its memory is fragmented, the storage system can perform a defragmentation operation on the memory. This defragmentation operation can be done invisibly to the host (i.e., without receiving any hint or instruction from the host to perform the defragmentation operation).

20 Claims, 8 Drawing Sheets

(56) References Cited

U.S. PATENT DOCUMENTS

| | | | | |
|---|---|---|---|---|
| 2009/0254594 | A1* | 10/2009 | Burchall | G06F 16/2453 |
| 2013/0145085 | A1* | 6/2013 | Yu | G06F 12/0246 |
| | | | | 711/103 |
| 2013/0166818 | A1* | 6/2013 | Sela | G06F 12/0246 |
| | | | | 711/159 |
| 2013/0226881 | A1* | 8/2013 | Sharma | G06F 16/1748 |
| | | | | 707/E17.005 |
| 2014/0075095 | A1* | 3/2014 | Manohar | G06F 3/0608 |
| | | | | 711/E12.008 |
| 2014/0207997 | A1* | 7/2014 | Peterson | G06F 12/0246 |
| | | | | 711/159 |
| 2015/0220268 | A1* | 8/2015 | Duzly | G06F 3/0679 |
| | | | | 711/103 |
| 2016/0283160 | A1* | 9/2016 | Trika | G06F 12/1466 |
| 2020/0401557 | A1* | 12/2020 | Struyve | G06F 3/0673 |

* cited by examiner

STORAGE SYSTEM AND METHOD FOR AUTOMATIC DEFRAGMENTATION OF MEMORY

CROSS-REFERENCE TO RELATED APPLICATION

This application claims the benefit of U.S. patent application Ser. No. 63/155,512, filed Mar. 2, 2021, which is hereby incorporated by reference herein.

BACKGROUND

Fragmentation of a memory of a storage system can reduce performance of the storage system. Such fragmentation can occur when a host writes an update to a file previously stored in the memory. Over time, the level of fragmentation can increase, resulting in an increased degradation of performance. In order to increase the performance of the storage system, electronic devices, such as personal computers, can perform a file system defragmentation operation, which will be useful only if logical addresses of files are fragmented

DETAILED DESCRIPTION

Figures 1A, 1B:
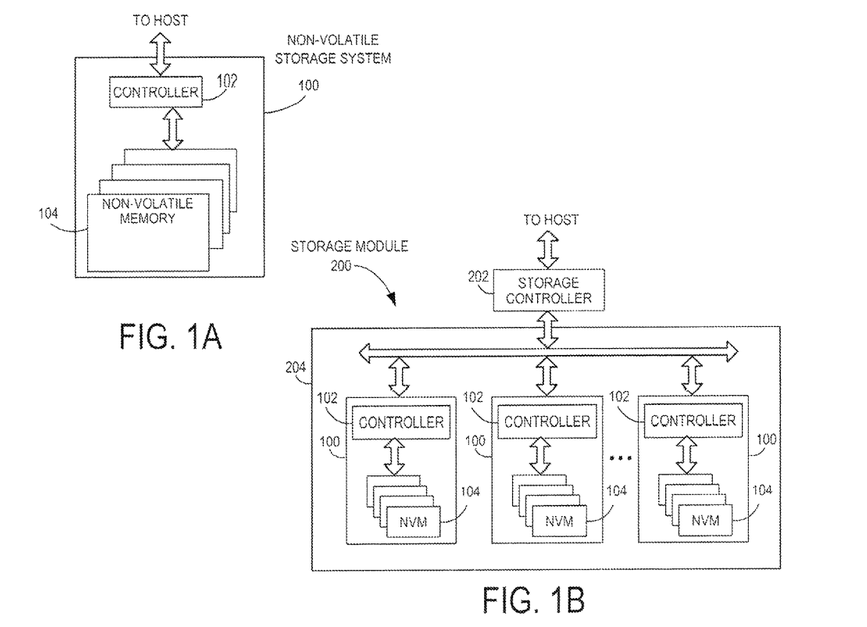
FIG. 1A is a block diagram of a non-volatile storage system of an embodiment.
FIG. 1B is a block diagram illustrating a storage module of an embodiment.
Figure 1C:
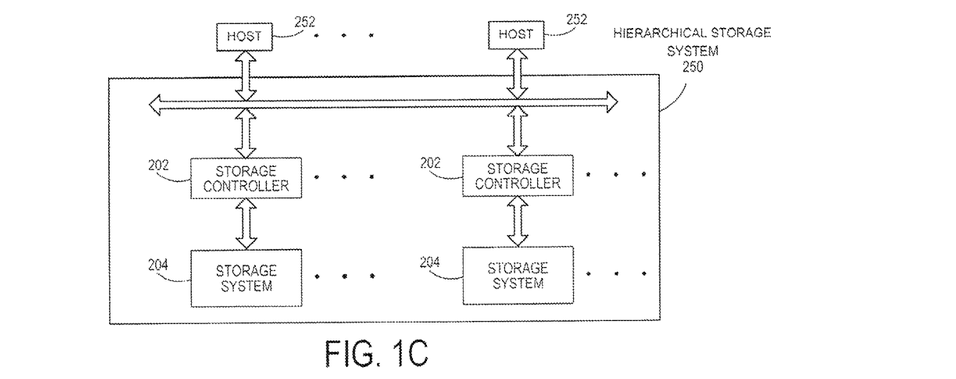
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
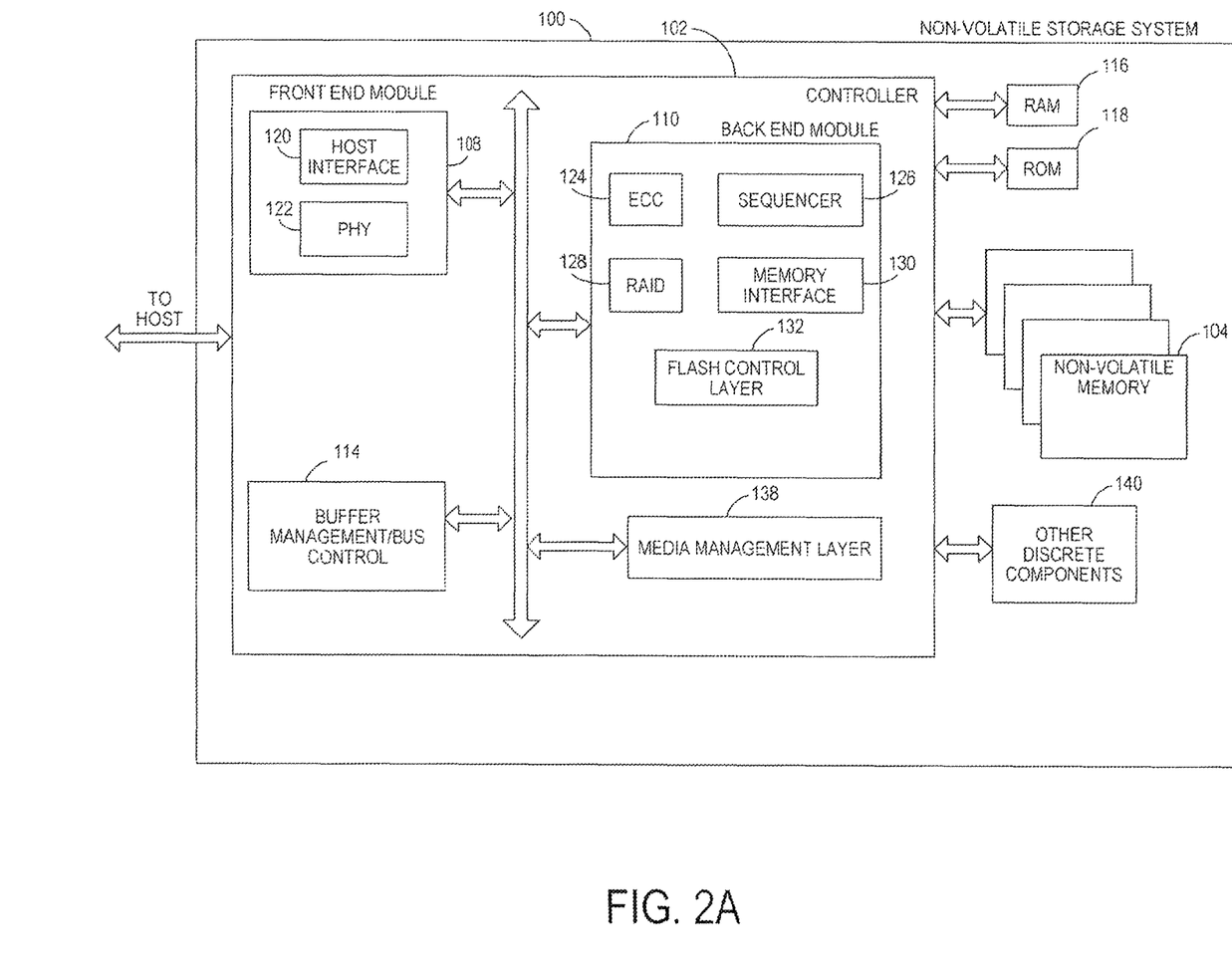
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
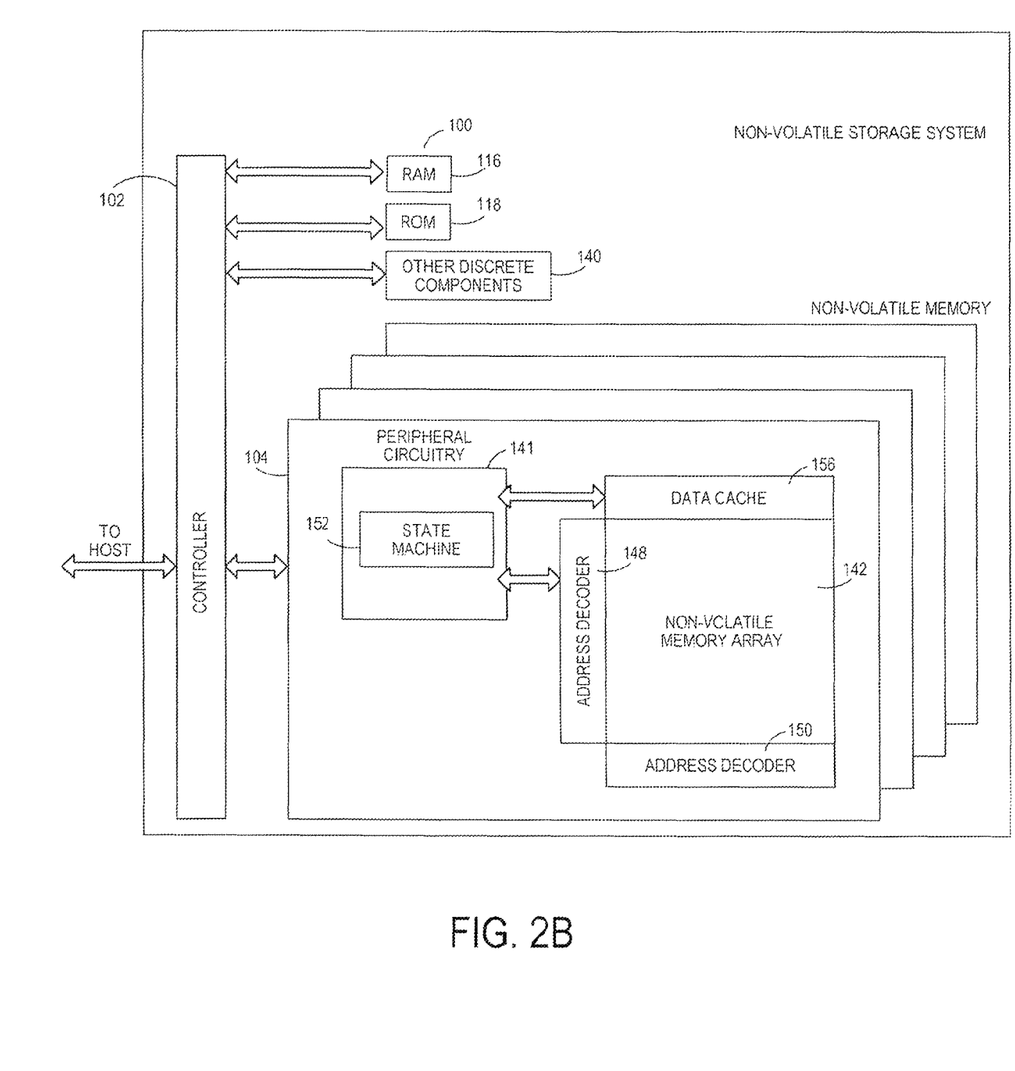
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
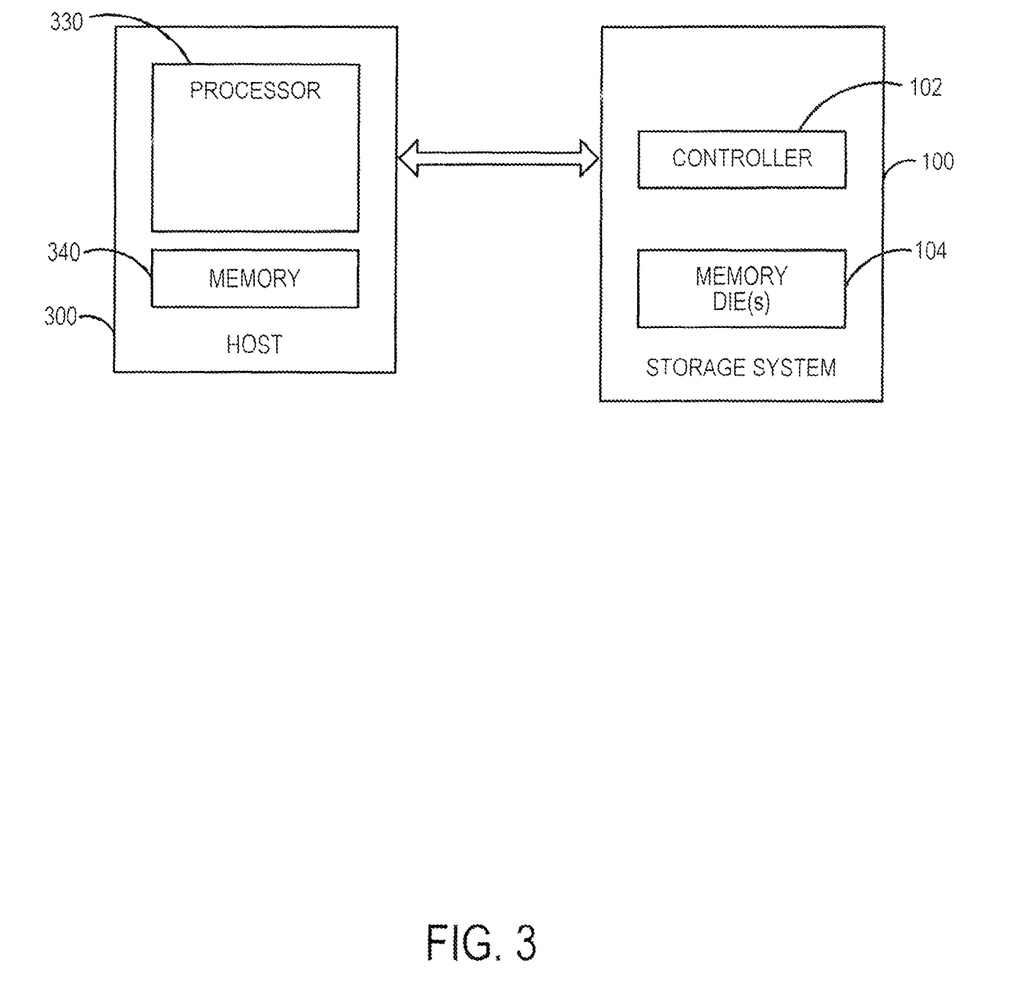
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

As mentioned above, fragmentation of the memory of a storage system can decrease performance of the storage system. Keeping storage at a consistent high performance as the host (e.g., phone or laptop) ages (e.g., after more than one year in operation in the field) is a major challenge and pain point for the mobile and consumer industries, which many original equipment manufacturers (OEMs) and storage vendors try to resolve. One of the main reasons for the degradation in performance observed on storage devices over time relates to NAND physical fragmentation on the storage media (memory), which is not aligned to the host file system layout within the host logical block address (LBA) range. That means that a file or a portion of a file that resides sequentially on the host LBA range may be fragmented on the physical NAND level. This situation may occur very frequently on storage systems due to the basic NAND attribute that NAND memory cannot be randomly accessed. As a result, every "update in place" to a file written by the host file system (i.e., a re-write of an already-written LBA) will need to be written serially on the NAND, which will create invalidations ("holes") in the previously-written NAND blocks. That basic operation of the file system will gradually increase the fragmentation level on the storage physical media while the file will still reside sequentially on the host LBA range. When the host performs a sequential read of a fragmented file or a portion of a fragmented file, the experienced performance may drop significantly due to the increased number of NAND data sense operations required to read the fragmented file.

Figure 4:
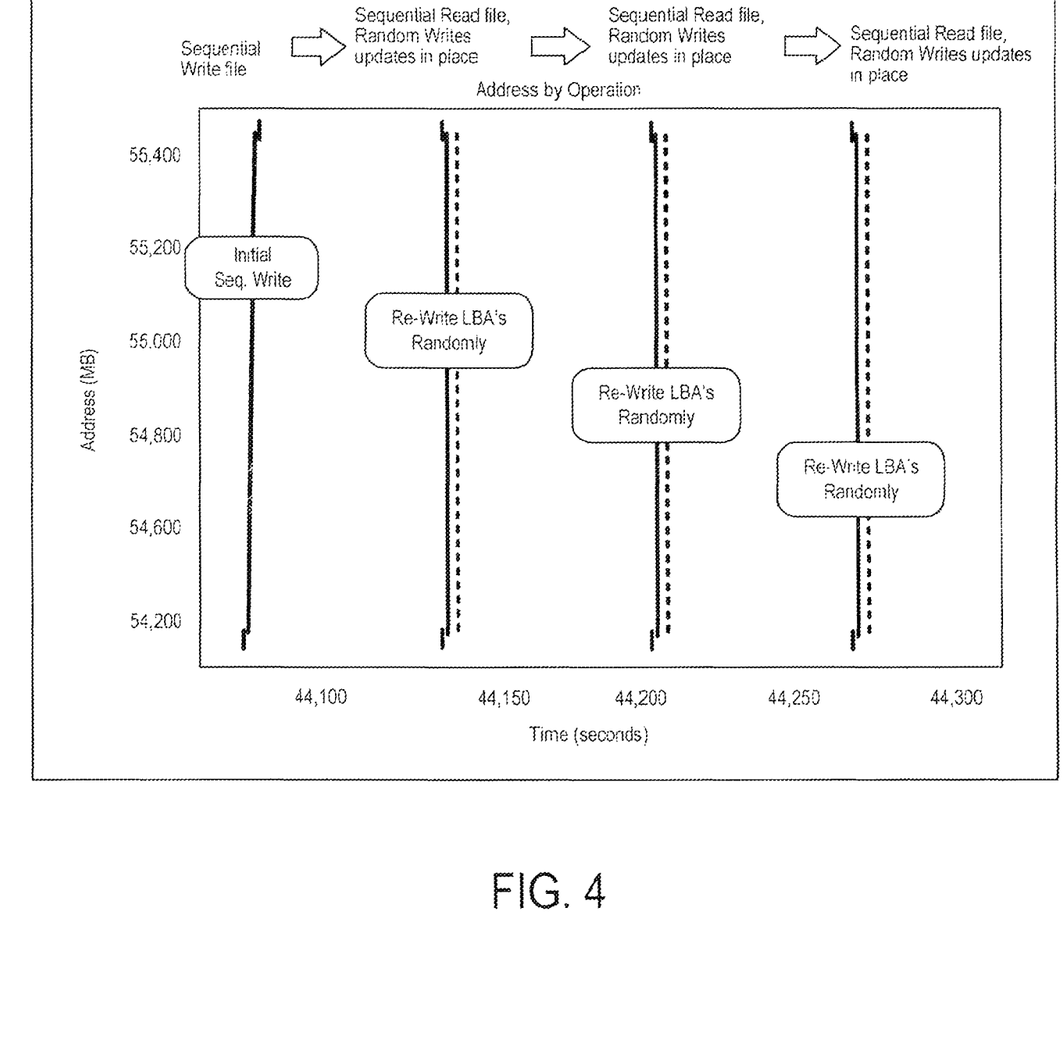
FIG. 4 is a graph of an embodiment that illustrates a degradation in sequential read performance over time due to physical fragmentation.

FIG. 4 is a graph that illustrates an example of test scenario that can result in degradation of storage sequential read performance due to physical fragmentation condition. In such example test, a file was written sequentially, and the maximum sequential read (SR) performance was measured. Then, a few cycles of random writes and sequential reads of the file were performed while the random write payload increased gradually from cycle to cycle. Under such test scenario, the storage physical fragmentation is gradually increased while the file still resides sequentially on the host logical address range. The storage physical fragmentation results in an increasing number of NAND data sense operations required in order to read the same file. If such file resides sequentially also on the physical media, every NAND page require a single NAND data sense. Then on the fragmented file condition, the number of NAND data senses can double or even triple. The increasing number of NAND data sense operations can result in performance degradation, which may drop to 20-40% of the maximum target performance, with respect to the increasing amount of NAND data sense operations that are required in order to read the file Host file systems have various solutions for fragmentation issues of file systems. For example, a host can use a defragmentation ("defrag") application or service triggered by a user on the host or can use a garbage collection mechanism (e.g., on a mobile flash-friendly file system (F2FS)) designed to consolidate and defrag the fragmented file layout. However, these solutions address the fragmentation case in which files are fragmented also on the host LBA layout. They do not solve a physical fragmentation for a file that resides sequentially on the host LBA range. Another solution would be to re-write the file by the host when experiencing severe degradation in sequential read performance. Rewriting the file by the host will re-arrange the data on the physical media in sequential order and would recover the performance. However, this is a sub-optimal solution as it is a relatively-complex implementation and can have a heavy-endurance impact and implications that may wear-out the NAND storage too excessively. For example, the entirety of a one GB file would need to be re-written even if only ~25% of it is fragmented.

The following embodiments can be used to provide a systematic solution that can overcome this fragmentation problem to increase the performance of data storage devices (also referred to herein as storage systems). These embodiments may find particular advantage with storage systems that have been in the operation in the field for about a year or more. In general, these embodiments provide an automatic defragmentation of the memory 104 by the storage system 100 without any particular command or instruction from the host 300. As such, the defragmentation operation is invisible to the host 300. For example, if a cell phone is the host 300, the storage system 100 is integrated in the phone, and the memory 104 is NAND memory, the storage system 100 can determine, by itself, when the memory 104 is fragmented and perform some defragmentation. In one particular implementation, the storage system 100 can initiate a defragmentation operation based on the number of data senses required to perform a read. These embodiments can be used to improve read performance, which is degraded when a file is fragmented.

In one embodiment (shown in FIG. 5), the controller 102 of the storage system 100 contains an auto-defrag module 600. In general, the auto-defrag module 600 can be hardware and/or software that is configured to monitor the NAND die sense operations per page read and auto-defrag the memory 104 accordingly to improve read performance. In one implementation, the auto-defrag module 600 can be executed internally by the storage system's firmware in order to gradually improve physical file fragmentation conditions and prevent degradation of sequential read performance over time. Other implementations are possible.

Figure 5:
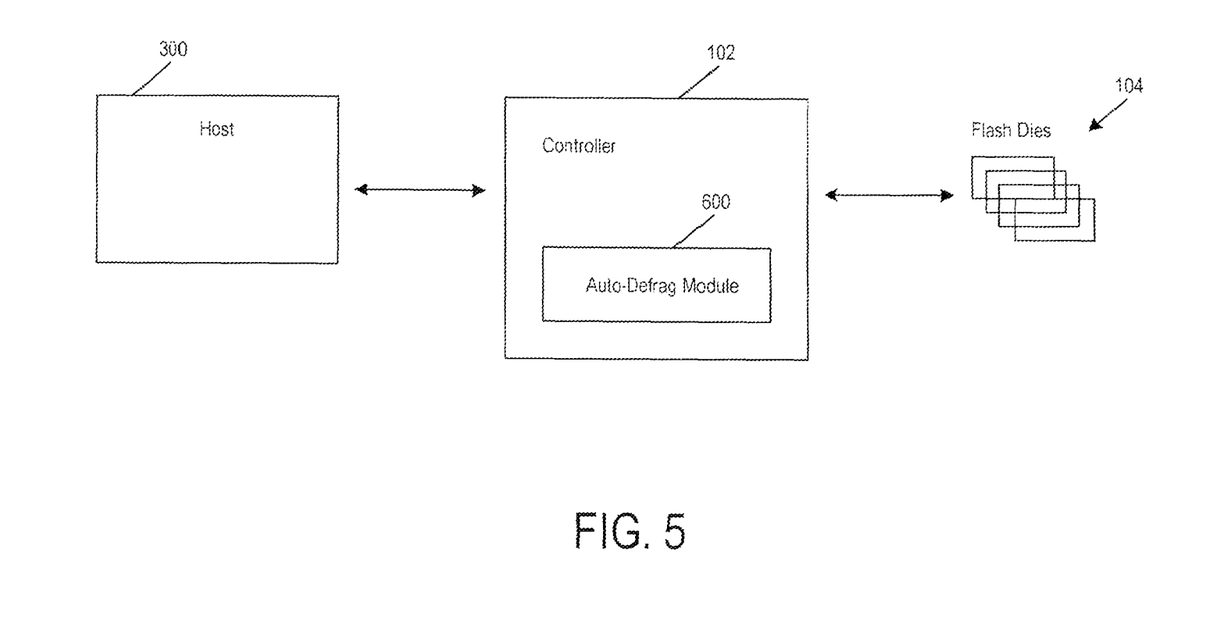
FIG. 5 is a block diagram of a host and a storage system of an embodiment.

The auto-defrag module 600 can be configured to monitor the number of data senses the controller 102 performs per each host read that is greater than the NAND read page size. When the host performs a read command that is greater than the NAND read page size, that indicates to the controller's flash translation layer (FTL) that this group of addresses (LBAs) resides sequentially on the host logical addresses. The controller's flash translation layer (FTL) can then count the number of data senses being performed during this host read and, for each page size, check if the data sense count exceeds a certain threshold, which indicates high fragmentation within the page (e.g., if more than three or four data senses are required instead of the original single data sense per page). If the threshold is exceeded, the controller 102 can mark the identified fragmented page for the auto-defrag process, which would re-write the page data sequentially in the memory 104.

In one embodiment, the operation of the auto-defrag module 600 is completely transparent to the host 300. The storage system 100 may be configured to update the host 300 with new FTL mapping, but its operation is fully independent to the host 300.

Figure 6:
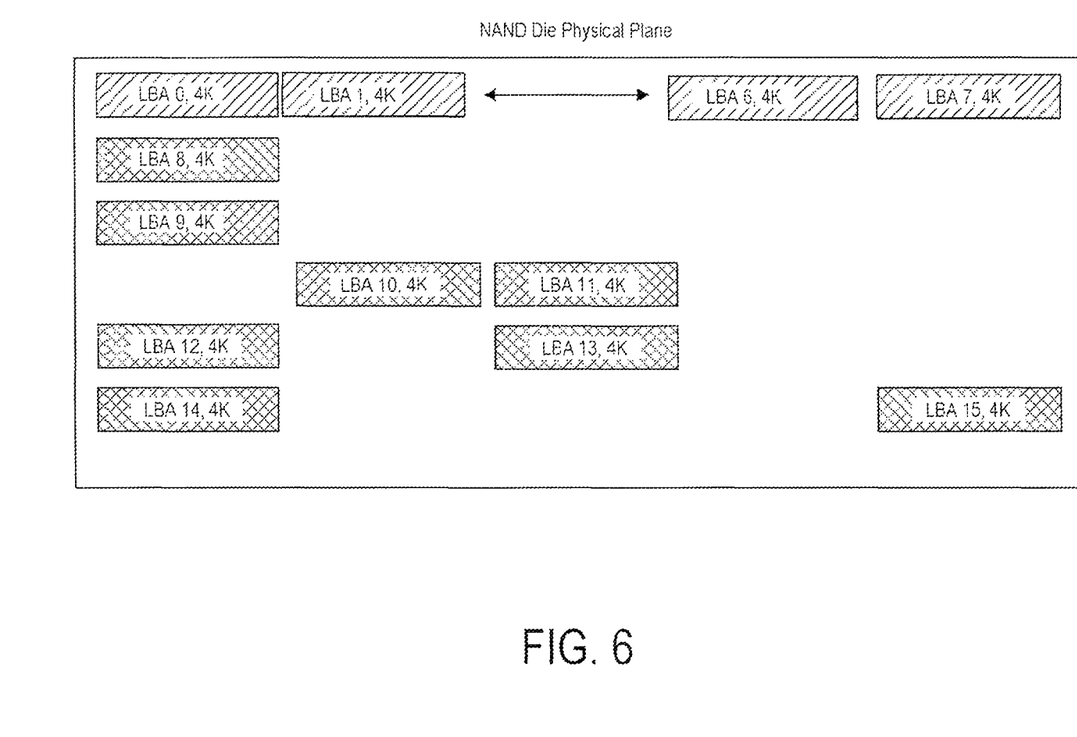
FIG. 6 is an illustration of fragmented memory of an embodiment.

FIG. 6 illustrates a fragmented memory and the auto-defrag process. The fragmented memory can be due, for example, to random writes and repeatable updates of the same LBA range by the host 300. In this example, at least five read senses of different memory physical word lines will be needed to aggregate the requested logical page for the host read.

Figure 7:
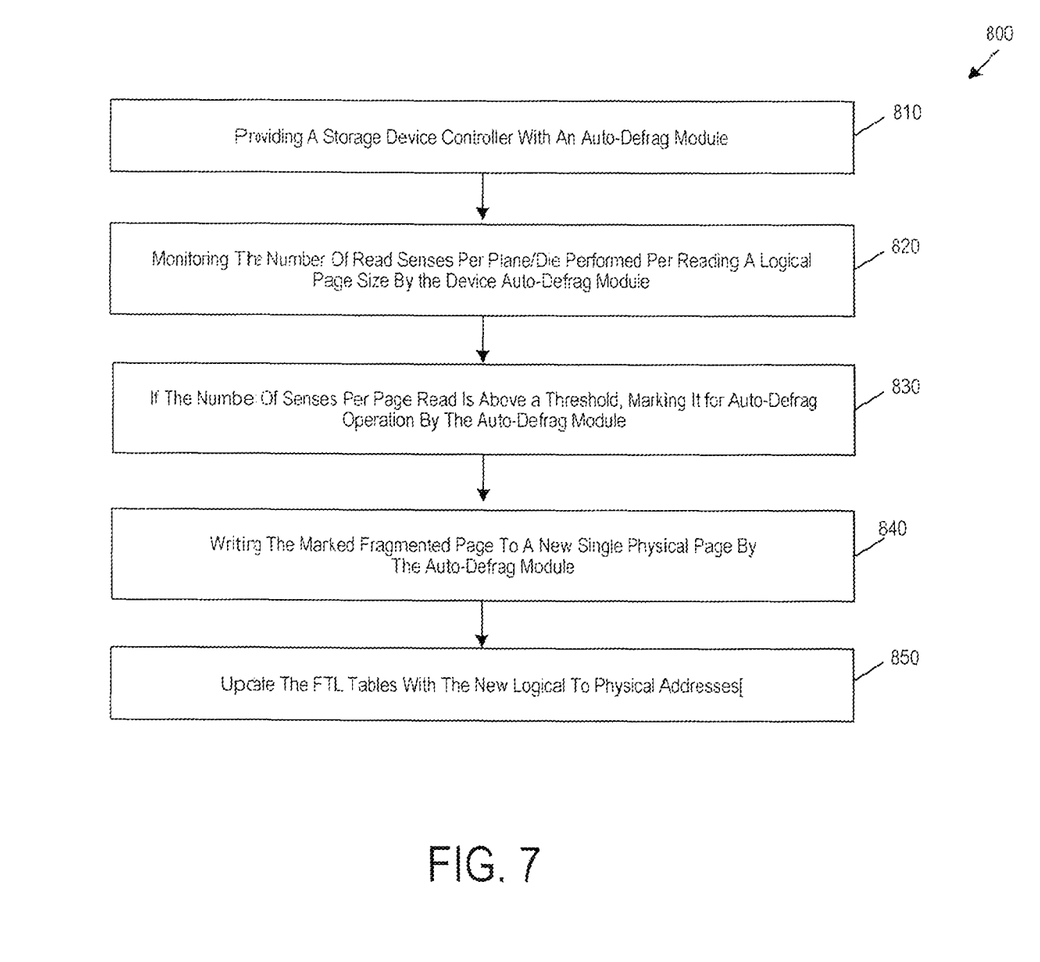
FIG. 7 is a flow chart of a method of an embodiment for automatically defragmenting a memory of a storage system.

FIG. 7 is a flow chart 800 of a method of an embodiment for automatically defragmenting the memory 104 of the storage system 100. As shown in FIG. 7, the controller 102 is provided with an auto-defrag module 600 (act 810). The auto-defrag module 600 monitors the number of read senses per plane/die performed per reading a logical page size (act 820). If the number of senses per page is above a threshold, the auto-defrag module 600 marks the page for an auto-defrag operation (act 830). The auto-defrag module 600 then writes the marked fragmented page to a new single physical page (act 840). Finally, the auto-defrag module 600 updates the FFL tables with the new logical-to-physical addresses (act 850).

The auto-defrag process can be implemented in any suitable way. The following paragraphs provide two example implementations. It should be understood that these are merely examples, and other implementations can be used.

One example implementation is to perform the re-write of the fragmented pages ("auto-defrag") during the host read itself. The advantage of this direct approach is that the page data already resides in the storage system's internal SRAM, and now it only requires writing this page again without any precondition scanning of the logical-to-physical address tables and reading the data to controller's RAM. Since the read page is already in a heavily-fragmented state, the read performance is reduced in the first place, so spending some more time on the recovery and receiving the benefit from the results on the next reads may be the right performance tradeoff for some storage implementations.

The decision whether or not to perform the auto-defrag during the host read itself can also take into account a certain ratio that will guarantee the right balance between host reads and internal auto-defrag writes. For example, on every 20 host page reads, the storage system 100 can allow one page auto-defrag operation. Good balancing between these two factors can guarantee that the performance impact of the defrag operation would be minor or not noticeable by the host 300.

Another example implementation is to aggregate pages for auto-defrag in a list and use it later by the internal garbage collection processes. The list can be limited to a certain number of pages (e.g., 1,000 entries) due to storage SRAM limitations. In order to optimize this list usage and cover more potential defrag candidates, the list can be optimized with run length compression. For example, if there are four consecutive pages or found as relevant candidates for defrag, they can be captured in one table entry. The garbage collection processes can review the list and perform the internal read and re-write ("defrag") per page.

As this proactive defrag activity performed by the storage system 100 may create more internal write operations performed to the NAND 104, this feature's impact on endurance and write amplification can be monitored by the controller 102. The controller 102 may be configured to calculate the amount of data writes driven by this defrag operation and limit them to a certain terabytes written limit. The controller 102 may be configured to disable this feature internally once the program/erase count exceeds a certain threshold, and the controller 102 may be configured to perform the auto-defrag on single-level cell (SLC) memory or triple-level cell (TLC) memory exclusively or on both of them.

Another mechanism that can be used for fine tuning the auto-defrag usage to the most-needed cases is hot/cold monitoring by the controller 102. The hot/cold monitoring may be done, for example, in a resolution of few megabytes (MB) of host LBA regions (e.g., 16 MB or 32 MB) in order to optimize storage SRAM consumption. Hot/cold classification can be done by counting the latest read operation from each X MB region. The identified candidates can be sent to auto-defrag only if they belong to regions that were classified as "hot" (meaning the host 300 tends to read them relatively frequently, compared to "cold" data that is read less frequently), where it would be beneficial to re-write them and improve their sequential read performance.

There are several advantages associated with these embodiments. For example, the storage system auto-defrag method can optimize the sequential and random read performance observed by the host 300 over time and usage, and it can improve some of the experienced sluggishness that is typical in an old or heavily-used host (e.g., phones/laptops). These embodiments may also justify the removal of a host performance booster (HPB) write buffer from HPB 2.0 host implementation, which can improve storage overhead, queue utilization, and complexity of the host. HPB write buffer usage in HPB 2.0 is designed to handle scenarios of chunks that reside sequentially on the LBA but are fragmented on the media. Using these embodiments, the probability of such scenarios would decrease dramatically.

Also, because these embodiments determine fragmentation based on a host read (access) pattern, these embodiments rely upon actual host usage rather than translation table analysis to determine fragmentation. For example, if the host 300 reads a group of LBAs sequentially in a single read command, the controller 102 in the storage system 100 can conclude that this page of data belongs to the same file and reside sequentially on the host 300 logical address range. As such, this group of LBAs should reside also sequentially in the memory 104. If the page of data does not, in fact, reside sequentially in the memory 104, the controller 102 can conclude that the page of memory is fragmented. Further, as mentioned above, the defragmentation operation triggered by these embodiments can be performed on-the-fly during a read operation without a need to use an offline post-processing method that uses a pre-calculated table or other offline analysis.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention.

It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory;
   an interface configured to communicate with a host; and
   a controller configured to communicate with the memory and the interface and further configured to:
   determine whether an area of the memory is fragmented based on a number of data sense operations required to perform a host read of the area of the memory; and
   in response to determining that the area of the memory is fragmented, determine whether a defragmentation operation is permitted during the host read based on a ratio of host reads and defragmentation operations; and
   in response to determining that the defragmentation operation is permitted during the host read, perform the defragmentation operation on the area of the memory during the host read, wherein the defragmentation operation is performed without receiving an instruction from the host to perform the defragmentation operation.

2. The storage system of claim 1, wherein the controller is configured to perform the defragmentation operation autonomously without receiving a hint or instruction from the host to perform the defragmentation operation.

3. The storage system of claim 2, wherein the controller is further configured to:
   determine whether the number of data sense operations required to read a page exceeds a threshold; and
   in response to determining that the number of data sense operations required to read the page operation exceeds the threshold, mark the page for defragmentation.

4. The storage system of claim 1, wherein the controller is further configured to update the host with a new logical-to-physical address map that reflects a result of the defragmentation operation.

5. The storage system of claim 1, wherein the controller is further configured to determining a frequency for performing defragmentation operations during host reads.

6. The storage system of claim 1, wherein the controller is further configured to aggregate pages for defragmentation and perform the defragmentation operations for the aggregated pages during a garbage collection operation.

7. The storage system of claim 6, wherein the controller is further configured to limit a number of the aggregated pages on which the defragmentation operations are performed.

8. The storage system of claim 6, wherein the controller is further configured to generate a list of the aggregated pages and optimize the list using run length compression.

9. The storage system of claim 1, wherein the controller is further configured to consider at least one of the following in determining whether to perform the defragmentation operation: a hot/cold classification of data stored in the memory, a number of bits stored per memory cell, an endurance impact caused by performing the defragmentation operation, and write amplification impact caused by performing the defragmentation operation.

10. The storage system of claim 1, wherein the controller is further configured to disable automatic defragmentation in response to a program/erase count exceeding a threshold.

11. The storage system of claim 1, wherein the controller is further configured to determine that the memory is fragmented in response to a host read pattern indicating that a group of logical block addresses belonging to a same file and residing sequentially on a host logical address range is being read but that data of this group of logical block addresses is stored non-sequentially in the memory.

12. The storage system of claim 1, wherein the controller is further configured to determine whether the memory is fragmented on-the-fly without using an offline analysis.

13. The storage system of claim 1, wherein the storage system is configured to be integrated in the host.

14. The storage system of claim 1, wherein the memory comprises a three-dimensional memory.

15. In a storage system comprising a memory, a method comprising:
    determining whether an area of the memory is fragmented based on a host read pattern; and
    in response to determining that the area of the memory is fragmented, determining whether a defragmentation operation is permitted during a host read based on a ratio of host reads and defragmentation operations; and
    in response to determining that the defragmentation operation is permitted during the host read, performing the defragmentation operation on the area of the memory during the host read, wherein the defragmentation operation is performed without receiving an instruction from the host to perform the defragmentation operation.

16. The method of claim 15, wherein the memory is determined to be fragmented when the host read pattern indicates a sequential or sequential portion of a file is being read but data of the file in stored non-sequentially in the memory.

17. The method of claim 15, wherein the defragmentation operation is performed autonomously without receiving a hint or instruction from the host to perform the defragmentation operation.

18. The method of claim 15, further comprising updating the host with a new logical-to-physical address map that reflects a result of the defragmentation operation.

19. The method of claim 15, further comprising disabling automatic defragmentation in response to a program/erase count exceeding a threshold.

20. A storage system comprising:
    a memory;
    means for determining whether an area of the memory is fragmented based on a number of data sense operations required to perform a host read of the area of the memory;
    means for determining whether a defragmentation operation is permitted during the host read based on a ratio of host reads and defragmentation operations in response to determining that the area of the memory is fragmented; and
    means for performing the defragmentation operation on the area of the memory during the host read, wherein the defragmentation operation is performed without receiving an instruction from the host to perform the defragmentation operation in response to determining that the defragmentation operation is permitted during the host read.

* * * * *